(12) United States Patent
Ertmer et al.

(10) Patent No.: US 8,748,777 B2
(45) Date of Patent: Jun. 10, 2014

(54) GAS CYLINDER SUPPORT SYSTEM FOR A WELDING-TYPE DEVICE

(75) Inventors: Jonathan R. Ertmer, Greenville, WI (US); Herbert A. Banksthal, Appleton, WI (US)

(73) Assignee: Illinois Tool Works, Inc., Glenview, IL (US)

( * ) Notice: Subject to any disclaimer, the term of this patent is extended or adjusted under 35 U.S.C. 154(b) by 2422 days.

(21) Appl. No.: 11/567,342

(22) Filed: Dec. 6, 2006

(65) Prior Publication Data
US 2008/0135695 A1    Jun. 12, 2008

(51) Int. Cl.
B23K 9/00    (2006.01)
B23K 35/38    (2006.01)

(52) U.S. Cl.
USPC .............................................. 219/136; 219/74

(58) Field of Classification Search
USPC ......................................... 219/74, 130.1, 136
See application file for complete search history.

(56) References Cited

U.S. PATENT DOCUMENTS

| | | | |
|---|---|---|---|
| 1,327,338 A * | 1/1920 | Levinson et al. | 280/415.1 |
| 1,361,728 A * | 12/1920 | Holdefer | 280/47.27 |
| 3,108,179 A | 10/1963 | Ulli | |
| 3,194,943 A | 7/1965 | Flora | |
| 3,237,051 A | 2/1966 | Schober | |
| 3,471,046 A | 10/1969 | Hess | |
| 3,682,342 A | 8/1972 | Evans | |
| 4,021,070 A | 5/1977 | Shea | |
| 4,253,716 A * | 3/1981 | Turner, Jr. | 312/100 |
| 4,294,481 A | 10/1981 | Pearl | |
| 4,437,710 A | 3/1984 | MacFarland | |
| 4,536,123 A | 8/1985 | Snyder | |
| 4,573,665 A | 3/1986 | Strohl et al. | |
| 4,625,949 A | 12/1986 | Walker | |
| 4,738,582 A | 4/1988 | Roberts | |
| 5,145,311 A | 9/1992 | Salvucci | |
| 5,281,246 A | 1/1994 | Ray et al. | |
| 5,440,098 A | 8/1995 | Matus | |
| 5,730,891 A | 3/1998 | Karpoff et al. | |
| 6,590,184 B1 | 7/2003 | Andersen | |

(Continued)

FOREIGN PATENT DOCUMENTS

FR    2650567 A  *  2/1991

OTHER PUBLICATIONS

Machine translation of FR 2650567 A, Dubois et al., "Supporting container esp. for gas cylinder", Feb. 8, 1991.*

*Primary Examiner* — Sang Y Paik
(74) *Attorney, Agent, or Firm* — Quarles & Brady, LLP

(57) ABSTRACT

A tray system is designed to be affixed in a stationary position to a housing of a welding-type system to support a gas cylinder for use with the welding-type system. The tray includes a base extending from the housing to form an interior and a periphery. As such, the interior forms a platform configured to support the gas cylinder proximate to the housing. The tray also includes a wall extending up from the base along at least a portion of the periphery of the base to form a barrier along the portion of the periphery that restricts the gas cylinder from being removed from the base. A lifting tab is included that extends up from the base proximate to the wall to form a pivot axis for the gas cylinder against which the gas cylinder may be tilted and rotated to raise the gas cylinder onto the wall and remove the gas cylinder from the tray without manual lifting.

20 Claims, 5 Drawing Sheets

(56) References Cited

U.S. PATENT DOCUMENTS

| | | |
|---|---|---|
| 6,596,972 B1 | 7/2003 | Di Novo et al. |
| 6,616,153 B1 * | 9/2003 | Matre et al. ............ 280/47.29 |
| 6,930,282 B1 | 8/2005 | Di Novo et al. |
| 6,992,266 B1 | 1/2006 | Di Novo et al. |
| 2002/0074755 A1 * | 6/2002 | Burkett ............ 280/47.26 |
| 2005/0110232 A1 * | 5/2005 | DiBenedetto ........ 280/47.29 |
| 2005/0224489 A1 | 10/2005 | Matiash |

* cited by examiner

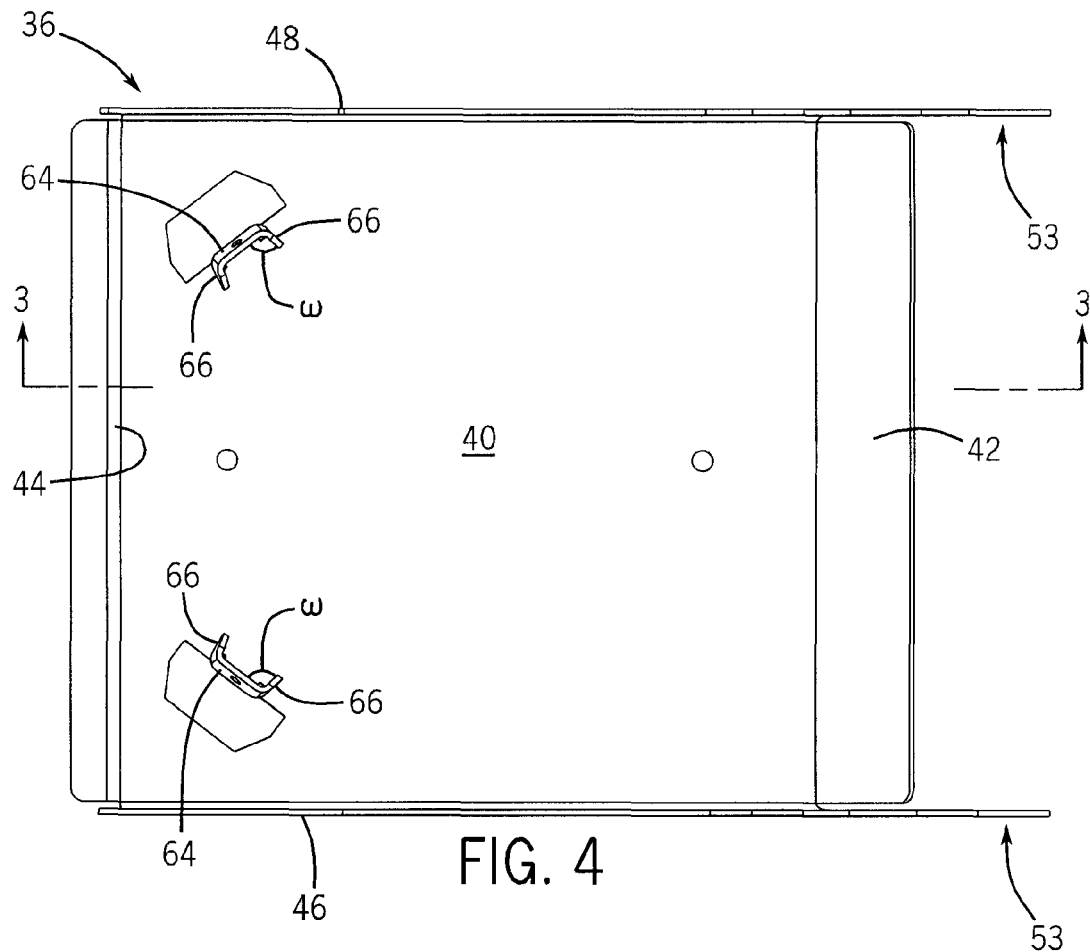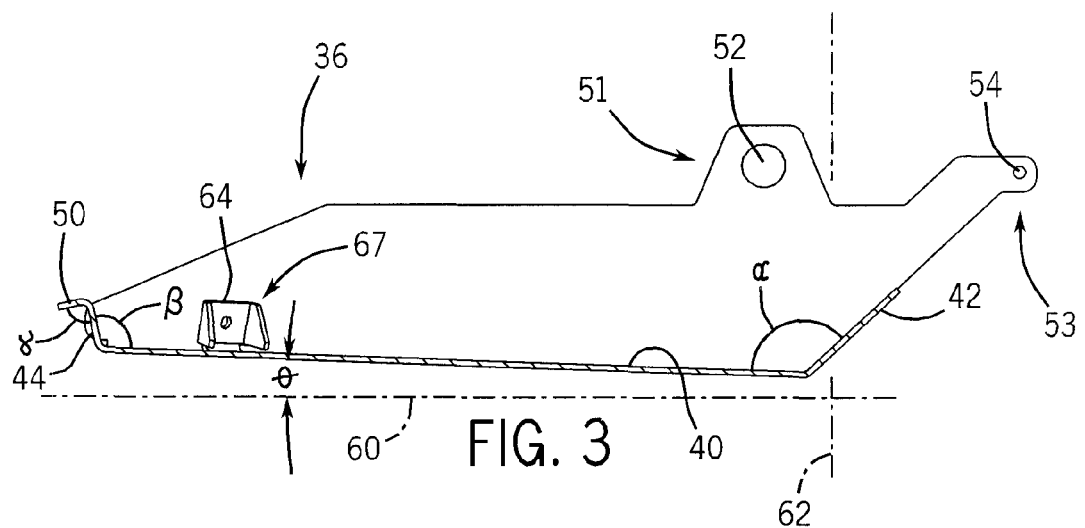

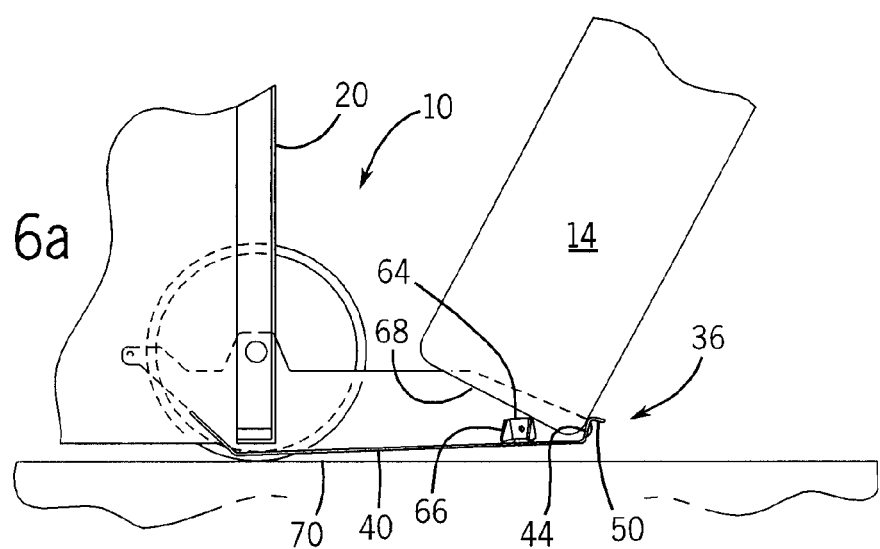
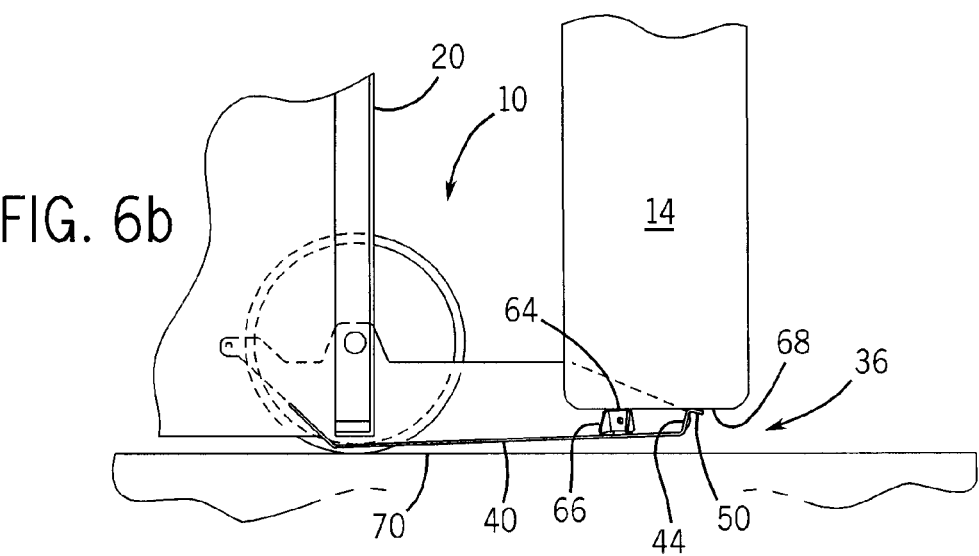
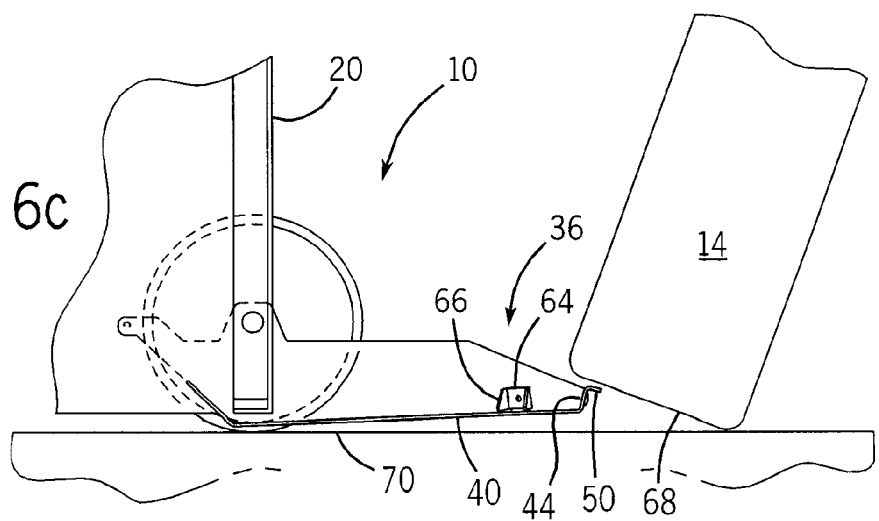

GAS CYLINDER SUPPORT SYSTEM FOR A WELDING-TYPE DEVICE

REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to welding-type systems and, more particularly, to a support system for compressed gas tanks, or gas cylinders, that are used with welding-type systems.

Various welding-type systems include a gas cylinder that supplies a compressed gas for use during a welding-type process, such as welding, plasma cutting, gouging, and the like. For example, during metal inert gas welding (MIG) or tungsten inert gas (TIG) welding processes, gas cylinders are used to supply an inert arc-shielding gas. On the other hand, during gouging processes and plasma cutting processes, gas cylinders are used to supply compressed air. Regardless of the particular gas supplied or the specific process being performed, the gas cylinders are generally large and heavy. For example, some gas cylinders, when full, can weigh in excess of 150 pounds.

When used with welding-type systems, the gas cylinders are typically supported on a tray or pan that is arranged near the rear of the welding-type system. In some cases, the tray or pan is part of a cart system that is separate from the welding-type device. However, it is typically preferable to mount the tray to the welding-type device. In this case, the welding-type device and tray are often supported on wheels that facilitate repositioning of the welding-type device and gas cylinders.

However, while elevating the gas cylinders on trays associated with the welding-type device provides a convenient storage location and, in some cases, facilitates movement of the welding-type device and gas cylinders, the elevated position adds significant labor to the process of replacing gas cylinders. In particular, an operator must, typically, "bear hug" the gas cylinder and lift the gas cylinder onto or off from the elevated tray. While some systems have been developed that bring the location of the tray closer to the ground in an effort to reduce the strenuous process of moving gas cylinders onto and off from the tray, these systems still require an operator to lift the gas cylinder from the ground to the height of the tray, typically, using a "bear hug" or similar process.

In an effort to further reduce the amount of physical labor required to change gas cylinders, some systems include mechanical lift systems that raise and lower the tray to facilitate loading and unloading. However, these mechanical lift systems include multiple moving parts and, thus, are prone to wear and damage caused by the repeated impact of gas cylinders being loaded onto and removed from the tray.

Therefore, it would be desirable to have a gas cylinder storage system that reduces the physical burden placed on the operator during the process of loading and unloading gas cylinders onto and off from the storage system and does not include moving parts that are susceptible to wear and damage.

BRIEF SUMMARY OF THE INVENTION

The present invention overcomes the aforementioned drawbacks by providing a system and method for loading and unloading gas cylinders onto and off from a storage system that does not require an operator to lift the gas cylinder and does not include moving parts.

In accordance with one aspect of the present invention, a tray is disclosed that is designed to be affixed in a stationary position to a housing of a welding-type system to support a gas cylinder for use with the welding-type system. The tray includes a base extending from the housing to form an interior and a periphery. As such, the interior forms a platform configured to support the gas cylinder proximate to the housing. The tray also includes a wall extending up from the substantially planar base along at least a portion of the periphery of the base to form a barrier along the portion of the periphery that restricts the gas cylinder from being removed from the base. A lifting tab is included that extends up from the base proximate to the wall to form a pivot axis for the gas cylinder against which the gas cylinder may be tilted and rotated to raise the gas cylinder onto the wall and remove the gas cylinder from the tray without manual lifting.

In accordance with another aspect of the present invention, a welding-type system is disclosed that includes a welding-type device having a housing extending from a base to a top and a power source arranged within the housing that is configured to deliver welding-type power to perform a welding-type process. The welding-type system also includes a tray extending from the housing proximate to the base to support a gas cylinder providing gas for the welding-type process. The tray includes a base extending from a front periphery arranged proximate to the base of the housing to a rear periphery to form an interior and side peripheries therebetween. The tray also includes a wall extending up from at least a portion the rear periphery of the base and a lifting tab extending up from the base within the interior and proximate to the wall. Accordingly, the lifting tab forms a pivot axis against which the gas cylinder can be tilted and rotated to raise the gas cylinder onto the wall and remove the gas cylinder from the base.

In accordance with yet another aspect of the invention, a welding-type system is disclosed that includes a housing having a base and a plurality of panels extending upwardly from the base and a top cover coupled to the plurality of panels to form an enclosure. A power supply is arranged within the enclosure that is configured to deliver welding-type power for a welding-type process. The welding-type system also includes a gas cylinder support system coupled to the base of the housing that is designed to support a gas cylinder that delivers gas for the welding-type process. The gas cylinder support system includes a substantially planar base and a wall extending up from the substantially planar base along a periphery of the substantially planar base to restrict movement of a gas cylinder from the substantially planar base. A mounting lip extends from a portion of the wall down toward the substantially planar base to form a planar platform and a lifting tab extends up from the substantially planar base proximate to the wall to form a pivot axis against which the gas cylinder may be tilted and rotated to raise the gas cylinder onto the mounting lip. Accordingly, the gas cylinder can slide down the mounting lip to be removed from the gas cylinder support system without manually lifting the gas cylinder.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and:

FIG. 3 is a cross-sectional view of the gas cylinder storage system of FIGS. 1 and 2;

FIG. 4 is a plan view of the gas cylinder storage tray of FIGS. 1-3;

FIGS. 6a through 6c are side-elevational views of the welding-type system including the gas cylinder storage system of FIGS. 1-4 shown in cross section during a gas cylinder unloading process in accordance with the present invention.

DETAILED DESCRIPTION OF THE INVENTION

Figure 1:
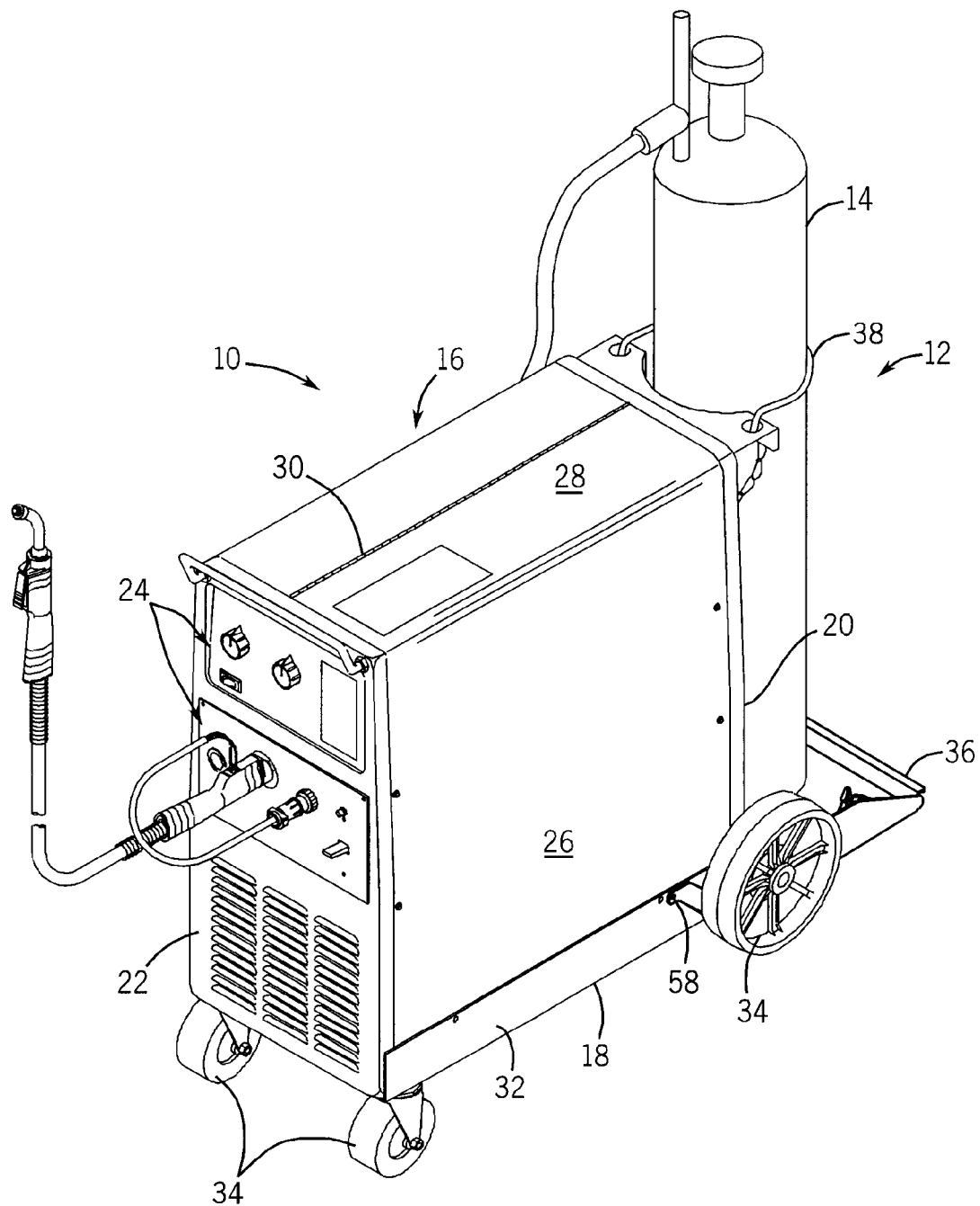
FIG. 1 is a perspective view of a welding-type system and gas cylinder storage tray in accordance with the present invention.

Referring now to FIG. 1, a welding-type system 10 is shown that includes a gas cylinder storage system 12 having a gas cylinder 14 stored thereon. Reference to welding-type systems, welding-type devices, and welding-type power is used to describe systems and power that have operational characteristics similar to welding systems, such as welding systems, induction heating systems, plasma cutting systems, and the like. The welding-type system 10 includes a housing 16 having a base 18, and a plurality of panels spaced apart from one another and extending upwardly from the base 18. The plurality of panels includes a back panel 20, a front panel 22 having a plurality of user interface components 24 arranged thereon, opposing side panels 26, and a top cover 28. The top cover 28 includes a hinge 30 that allows a portion of the top cover 28 to be opened to provide access to the interior of the housing 16.

The housing 16 is arranged on a frame 32 that connects the housing 16 to a plurality of wheels 34. Extending proximate to the back panel 20 is a rack or tray 36 that, along with a strap, cable, or other securing device 38 that is mounted to the back panel 20, forms the gas cylinder storage system 12. As will be described below, the tray 36 is arranged at a relatively low height and is designed to facilitate loading and unloading the gas cylinder 14 without having to lift the gas cylinder 14 onto the tray 36.

Figure 2:
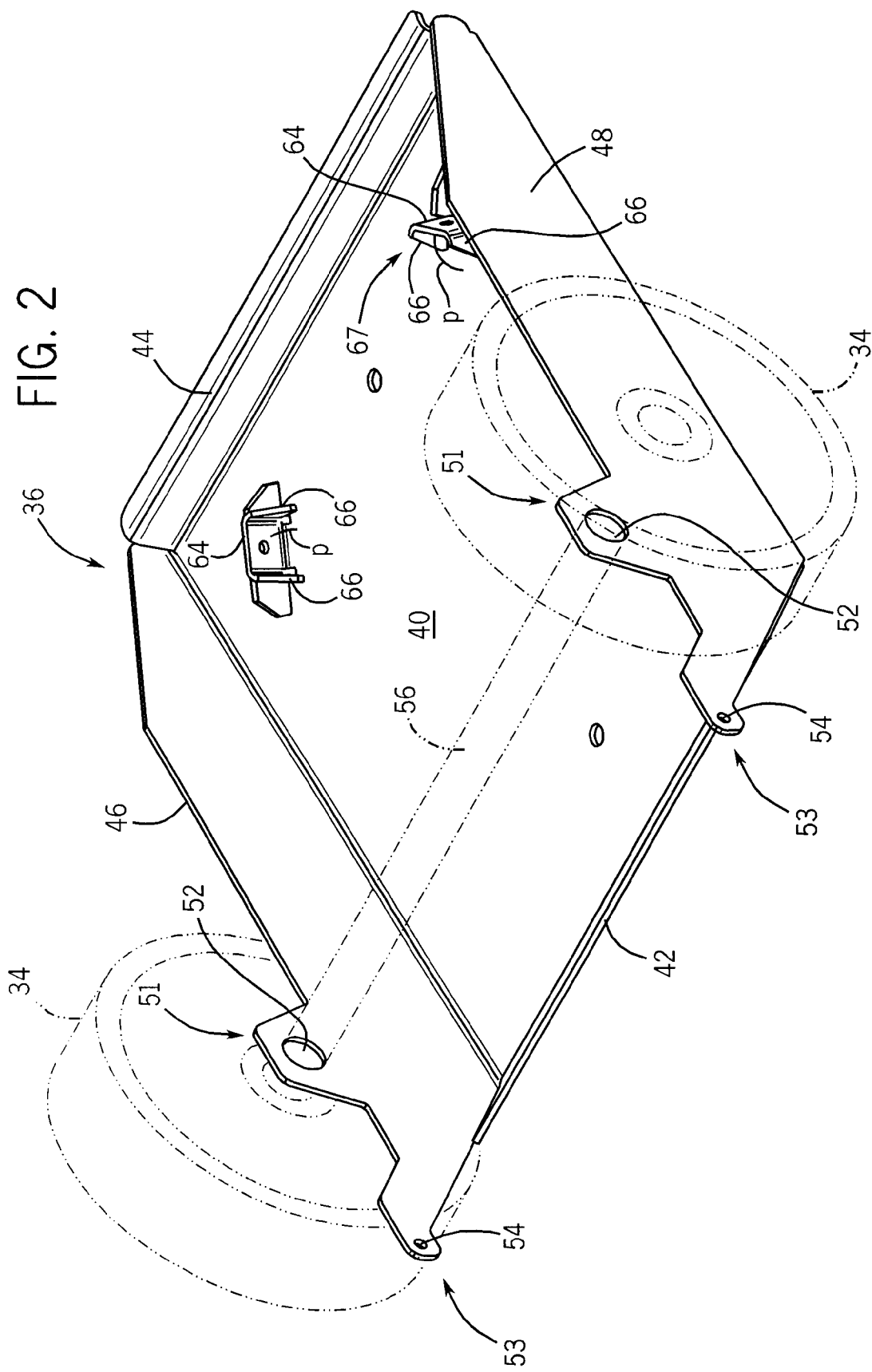
FIG. 2 is a perspective view of the gas cylinder storage tray of FIG. 1.

Referring now to FIGS. 2-4, the tray 36 includes a substantially planar base 40 that forms a support surface for gas cylinders, as shown in FIG. 1. A front wall 42, a rear wall 44, and a pair of side walls 46, 48 are included that extend up from the base 40 about a periphery of the base 40. In accordance with one embodiment, the front wall 42 extends up and away from the base 40 to form an angle α with the base 40 of, for example, 135 degrees. Likewise, the rear wall 44 extends up and away from the base 40 to form an angle β with the base 40 of, for example, 105 degrees. As will be described, these values of α, β are for exemplary purposes only and a variety of other values for the angles α and β are contemplated.

A mounting lip 50 extends from the rear wall 44. Specifically, the mounting lip 50 extends away from the base 40 to form a platform that, as will be described in detail with respect to FIGS. 5a through 6c, is configured to receive a gas cylinder when being positioned on and removed from the base 40. The mounting lip 50 forms an angle γ with the rear wall 44 of, for example, approximately 90 degrees. However, it is contemplated that the mounting lip 50 may be configured to form the angle γ to have a value of greater than or less than 90 degrees. For example, it is contemplated that the angle γ may be augmented based on the value of the angle β. In particular, the mounting lip 50 is designed to not be parallel with the base 40. Rather, the mounting lip 50 is designed to extend in a direction downward with respect to the plane formed by the base 40. As will be described with respect to FIGS. 5a, 5b, and 6a-6c, this downwardly sloping surface formed by the mounting lip 50 facilitates loading and unloading of gas cylinders without the need to lift the gas cylinders to and from the base 40.

Extending from each of the side walls 46, 48 is an axle mounting flange 51 including an axle passage 52 and a tray mounting flange 53 including a mounting passage 54. As best illustrated in FIGS. 1 and 2, the axle passage 52 is configured to receive an axle 56 engaged with a wheel 34 at each end to support the tray 36. The mounting flanges 53 are configured to be arranged along the side panels 26 of the welding-type system 10 where a fastening device 58 is passed through the mounting passages 54 to mount the tray 36 to the housing 16 of the welding-type system 10.

It is contemplated that the tray 36 is designed to be mounted to the welding-type system 10 such that the base 40 forms a slight incline away from the front wall 42. That is, as illustrated in FIG. 3, the base 40 forms an angle θ with respect to a plane 60 extending perpendicular to a vertical plane 62, such as formed by a back panel 20 of a welding-type system 10 of FIG. 1. When a gas cylinder is arranged on the tray 36, the angle θ is reduced under the weight of the gas cylinder. It is contemplated that the angle θ is selected such that the weight of the gas cylinder does not reduce the angle θ sufficiently to allow the gas cylinder to tilt away from the back panel 20 of the welding-type system 10. However, in many systems, the angle θ may be relatively small, for example, 2 degrees.

A pair of tabs 64 extends up from the base 40 that, as will be described, are designed to allow a gas cylinder to be positioned thereon as an intermediate step when being moved to and from the mounting lip 50. Each tab 64 extends up from the base 40 to form an angle ρ with the base 40 of, for example, 80 degrees. Additionally, each tab 64 includes a pair of arms 66 extending generally toward an interior of the base 40. In particular, the arms 66 form an angle ω with the tab 64 of, for example, 100 degrees. As will be described, the arms 66 are designed to reinforce the tab 64 against deformations caused when a gas cylinder is positioned thereon and facilitate positioning of the gas cylinder on the tray 36 using a taper 67 extending from the tab 64 toward the base 40.

Figure 5A:
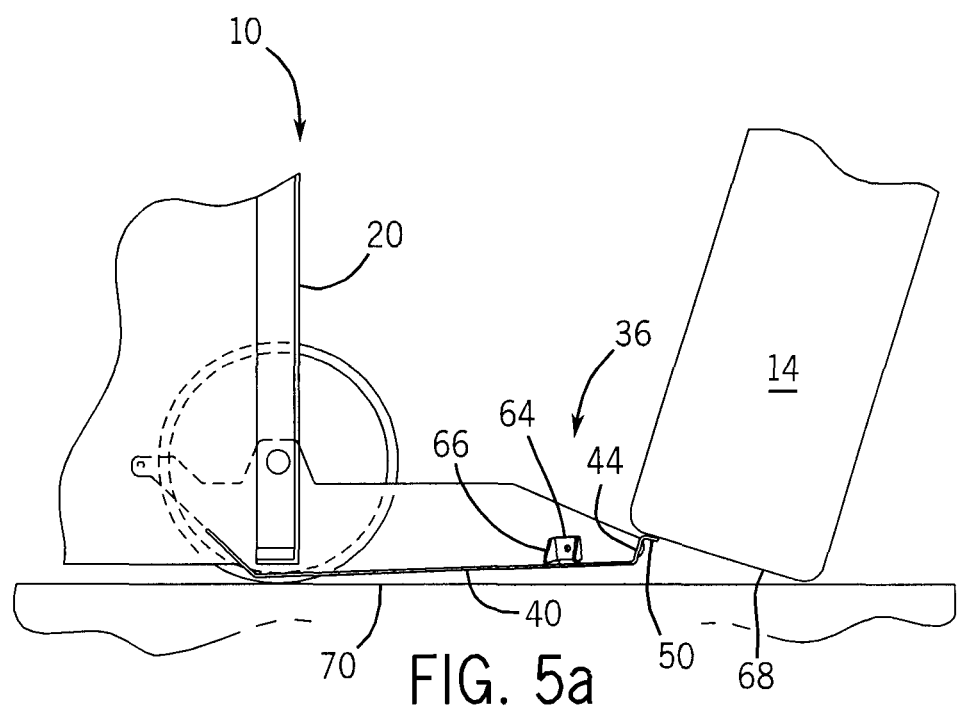
FIGS. 5a and 5b are side-elevational views of the welding-type system including the gas cylinder storage system of FIGS. 1-4 shown in cross section during a gas cylinder loading process in accordance with the present invention.

Referring now to FIG. 5a, the above-described gas cylinder storage system 12 and, in particular, the tray 36 is designed to facilitate loading and unloading gas cylinders 14 without the need to manually lift the gas cylinder 14 to and from the tray 36. To load the gas cylinder 14 onto the tray 36, the gas cylinder 14 is positioned proximate to the rear wall 44 of the tray 36 and tilted back away from the tray 36. The gas cylinder 14 is then rotated to position a bottom 68 of the gas cylinder 14 against the mounting lip 50 extending from the rear wall 44 of the tray 36. The above-described downward slope of the mounting lip 50 facilitates arranging the bottom 68 of the gas cylinder 14 against the mounting lip 50 when the gas cylinder is resting on the ground 70 by tilting the gas cylinder 14 away from the welding-type system 10.

Figure 5B:
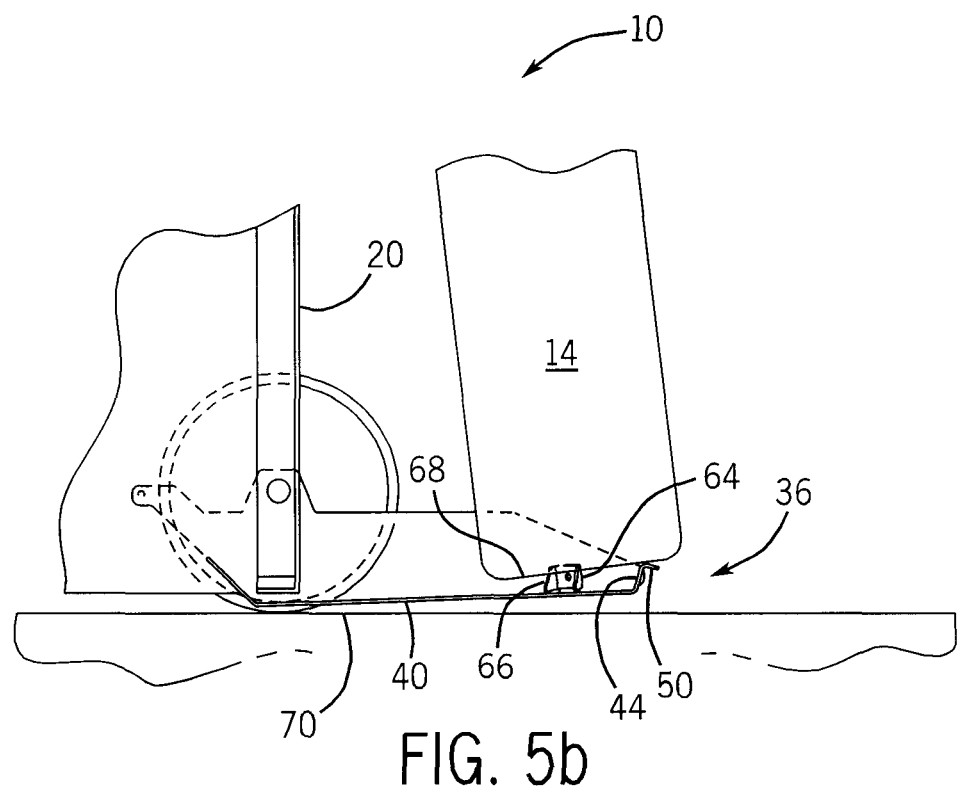

The above-described arrangement of the mounting lip 50 and rear wall 44 serves as a pivot axis against which the gas cylinder 14 is then pushed. Hence, as shown in FIG. 5b, the combination of the mounting lip 50 and rear wall 44 allows the gas cylinder 14 to be moved from the ground 70 onto the tray 36 without having to lift the gas cylinder 14 onto the tray 36. Rather, the gas cylinder 14 can be tilted and rotated on its base 68, which is significantly less physically demanding than lifting the gas cylinder 14. Once rotated onto the tray 36 using the mounting lip 50, the gas cylinder 14 can be rotated or slid into the storage position illustrated in FIG. 1 with minimal effort. In this regard, the tabs 64 aid in properly positioning the gas cylinder 14 by allowing the gas cylinder 14 to slide thereover and down the taper 67 of the arms 66. The gas cylinder 14 is then positioned as shown in FIG. 1.

Referring now to FIG. 6*a*, when the gas cylinder 14 is to be removed from the tray 36, the inverse of the process described with respect to FIGS. 5*a* and 5*b* is followed. However, since the gas bottle 14 cannot be simply tilted onto the mounting lip 50 because the rear panel 20 of the welding-type system 10 does not permit the gas cylinder 14 to be tilted into the position necessary to reach the over the rear wall 44 and onto the mounting lip 50, the tabs 64 are provided. Specifically, the gas cylinder 14 is moved proximate to the rear wall 44 and tilted away from the rear panel 20 of the welding-type system 10 into the position shown in FIG. 6*a*. The gas cylinder 14 is then pushed against one or more of the tabs 64. In this case, the above-described arms 66 serve to reinforce the tabs 64 against potential damage that could be caused by pushing the gas cylinder 14 against the tabs 64. In particular, the arms 66 are designed to engage the base 40 of the tray 40 to provide structural stability to the tabs 64. Hence, the arms 66 provide the dual purpose of aiding in the proper positioning of the gas cylinder 14 when being loaded on the tray 36 and reinforcing the tabs 64 against potential damage when unloading the gas cylinder from the tray 36.

Likewise, the tabs 64 play the dual role of facilitating proper positioning of the gas cylinder 14 when being loaded on the tray 36 and providing a mechanism for positioning the gas cylinder 14 on the rear wall 44 and mounting lip 50 when removing the gas cylinder 14 from the tray 36 without having to lift the gas cylinder 14. That is, once the gas cylinder 14 is rotated onto one or more of the tabs 64, as described above with respect to FIG. 6*a*, the gas cylinder 14 is rotated on the tabs 64 into the position shown in FIG. 6*b*. At this point, the gas cylinder 14 is tilted on the pivot axis formed by the mounting lip 50 and the rear wall 44 and permitted to slide down the mounting lip 50 until the base 68 reaches the ground 70. Accordingly, the gas cylinder can be rotated away from the tray 36 to rest squarely on the ground 70.

Therefore, the above-described system and method facilitates loading and unloading gas cylinders onto and off from a storage system without lifting the gas cylinder onto the storage system or the use of complex mechanical lift systems having moving parts. In fact, it is contemplated that the above-described tray may be manufactured in a single-piece construction to reduce manufacturing costs and improve robustness.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A welding-type system comprising:
    a welding-type device having a housing extending from a device base to a top;
    a power source arranged within the housing and configured to deliver welding-type power to perform a welding-type process;
    a tray extending from the housing proximate to the device base to support a gas cylinder providing gas for the welding-type process, the tray comprising:
        a tray base extending from a front periphery arranged proximate to the device base of the housing to a rear periphery to form an interior and side peripheries therebetween;
        a wall extending up from at least a portion of the rear periphery of the tray base; and
        a lifting tab extending up from the tray base within the interior and proximate to the wall to form a pivot axis against which to tilt the gas cylinder to raise the gas cylinder onto the wall and remove the gas cylinder from the tray base.

2. The welding-type system of claim 1 further comprising at least one arm extending from the lifting tab toward the interior of the tray base to engage the tray base when the lifting tab is forced toward the interior of the tray base by the gas cylinder being tilted against the lifting tab to raise the gas cylinder onto the wall.

3. The welding-type system of claim 2 wherein the at least one arm includes a taper extending from the lifting tab toward the tray base.

4. The welding-type system of claim 2 wherein the at least one arm extends from the lifting tab at an angle of approximately 100 degrees.

5. The welding-type system of claim 1 wherein the wall extends away from the tray base to form an angle with the tray base of greater than 90 degrees.

6. The welding-type system of claim 1 further comprising a lip extending down and away from tray base to form an angle with the wall of approximately 90 degrees.

7. The welding-type system of claim 1 further comprising a lip extending down and away from the tray base to form a platform configured to receive the gas cylinder when being positioned on and removed from the tray.

8. The welding-type system of claim 7 wherein the lip extends from the wall.

9. The welding-type system of claim 1 further comprising a pair of side walls extending up from the side peripheries of the tray base and a tray mounting flange extending from each side wall to engage the housing of the welding-type device.

10. The welding-type system of claim 1 further comprising a pair of side walls extending from the side peripheries of the tray base and an axle mounting flange extending from each of the side walls that receives an axle having a wheel extending therefrom to support the tray.

11. The welding-type system of claim 1 wherein the welding-type device includes at least one of a welding device, an induction heating device, and a plasma cutting device.

12. A tray affixed in a stationary position to a housing of a welding-type system to support a gas cylinder for use with the welding-type system, the tray comprising:
    a base extending from the housing to form an interior and a periphery, the interior forming a platform configured to support the gas cylinder proximate to the housing;
    a wall extending up from the base along at least a portion of the periphery of the base to form a barrier along the portion of the periphery that restricts the gas cylinder from being removed from the base; and
    a lifting tab extending up from the base proximate to the wall to form a pivot axis for the gas cylinder against which to tilt the gas cylinder to raise the gas cylinder onto the wall when removing the gas cylinder from the tray.

13. The tray of claim 12 further comprising at least one arm extending from the lifting tab toward the interior of the base to engage the base when the lifting tab is directed by the gas cylinder from the periphery of the base toward the interior of the base as the gas cylinder is tilted against the lifting tab.

14. The tray of claim 13 wherein the at least one arm extends from the lifting tab at an angle of approximately 100 degrees.

15. The tray of claim 12 further comprising a mounting lip extending down along at least a portion of the periphery to form a platform configured to receive the gas cylinder when being positioned on and removed from the base.

16. The tray of claim 15 wherein the wall extends up from the base at an angle of greater than 90 degrees, and wherein mounting lip extends from the wall at an angle of approximately 90 degrees.

17. The tray of claim 12 further comprising:
- a pair of side walls extending from the periphery of the base;
- a tray mounting flange extending from each side wall configured to engage the housing to affix the tray on the welding-type system; and
- an axle mounting flange extending from each side wall and configured to receive an axle arranging at least one wheel to support the tray.

18. A welding-type system comprising:
- a housing having a base and a plurality of panels extending upwardly from the base and a top cover coupled to the plurality of panels to form an enclosure;
- a power supply arranged within the enclosure and configured to deliver welding-type power for a welding-type process; and
- a gas cylinder support system coupled to the base of the housing and configured to support a gas cylinder to deliver gas for the welding-type process, the gas cylinder support system including:
  - a substantially planar base;
  - a wall extending up from the substantially planar base along a periphery of the substantially planar base to restrict movement of a gas cylinder from the substantially planar base;
  - a mounting lip extending from a portion of the wall down toward the substantially planar base to form a planar platform;
  - a lifting tab extending up from the substantially planar base proximate to the wall to form a pivot axis against which to tilt the gas cylinder to raise the gas cylinder onto the mounting lip and slide the gas cylinder down the mounting lip from the gas cylinder support system.

19. The welding-type system of claim 18 wherein the wall extends up and away from the substantially planar base at angle of greater than 90 degrees and wherein the mounting lip extends from the wall at an angle of approximately 90 degrees.

20. The welding-type system of claim 18 wherein the lifting tab extends up from the substantially planar base to form an angle therewith of less than 90 degrees along one side of the lifting tab and further comprising at least one arm extending from the lifting tab toward the one side of the lifting tab to engage the substantially planar base.

* * * * *